United States Patent [19]

Fritz et al.

[11] Patent Number: 5,141,827
[45] Date of Patent: Aug. 25, 1992

[54] ION CONDUCTOR OR ELECTROLYTE FOR A GALVANIC ELEMENT

[75] Inventors: Heinz P. Fritz, Garching; Klaus Stein, Unterschleissheim, both of Fed. Rep. of Germany

[73] Assignee: Varta Batterie Aktiengesellschaft, Hanover, Fed. Rep. of Germany

[21] Appl. No.: 569,627

[22] Filed: Aug. 20, 1990

[30] Foreign Application Priority Data

Sep. 4, 1989 [DE] Fed. Rep. of Germany ....... 3929316

[51] Int. Cl.$^5$ .............................................. H01M 6/22
[52] U.S. Cl. .................................... 429/191; 429/194; 252/62.2
[58] Field of Search ............... 429/190, 193, 194, 191; 252/62.2

[56] References Cited

U.S. PATENT DOCUMENTS 3,985,574 10/1976 Feuillade et al. ............... 429/190 X
4,792,504 12/1988 Schwab et al. .................. 429/190 X Primary Examiner—Stephen Kalafut
Attorney, Agent, or Firm—Weiser & Stapler

[57] ABSTRACT

An ion conductor/electrolyte especially suitable for lithium batteries is comprised of a chemically inert, electronically nonconducting solid powder and an electrolyte salt solution with an aprotic solvent. The ion conductor has a solid to pasty consistency depending upon the ratio of the mixture's components and has a specific conductivity ($\kappa$) of a magnitude $>10^{-3}$ S/cm at room temperature. Using this ion conductor, solid batteries can be developed with output capacities similar to those previously available only in connection with liquid organic electrolyte systems. Among others, $SiO_2$, $Al_2O_3$ and $TiO_2$ are favorable solids as carriers, especially with extensive surface areas. The liquid phase, which is immobilized by adsorption on these carriers, is formed of a solution of lithium or sodium salts in propylene carbonate, acetonitrile, gamma-butyrolactone, nitromethane, tetrahydrofuran and dimethoxyethane, or similar solvents.

11 Claims, No Drawings

ION CONDUCTOR OR ELECTROLYTE FOR A GALVANIC ELEMENT

BACKGROUND OF THE INVENTION

The present invention is generally directed to an ion conductor or electrolyte for galvanic elements, including lithium batteries with solid or at least immobilized electrolytes containing powdery, chemically inert solids.

In conventional secondary batteries such as lead storage batteries or in alkaline batteries, steps have been taken to limit mobility within the aqueous solutions of sulfuric acid or alkali liquor, for reasons of reliability. In the case of lead-acid electrolytes, for example, this is achieved by determining the necessary minimum amount of electrolyte to be retained in the separator, or gel. As always, the more energy-rich cells, with alkali metal anodes, contain solvent-based liquid electrolytes. Electrolyte salts that are frequently used for this purpose include sodium or lithium salts with univalent anions such as $BF_4^-$, $AlCl_4^-$, $PF_6^-$, $AsF_6^-$, $ClO_4^-$, or $CF_3SO_3^-$, which are dissolved in solvents such as propylene carbonate, acetonitrile, gamma-butyrolactone or methyltetrahydrofuran. These electrolytes have a specific conductivity ($\kappa$) between $10^{-3}$ and $10^{-2}$ S/cm at room temperature (see D. Linden, "Handbook of Batteries & Fuel Cells", McGraw-Hill, 1984).

However, the structure of the more reliable solid batteries requires a solid, or at least a pasty electrolyte system. To date, the polyether complexes of alkali salts of the general structure poly-[(ethylene oxide)$_n$ M $^+$X $^-$], developed as the most positive representatives of a solid ion conductor (see, e.g., R. Huq and G. C. Farrington, Solid State Ionics 28/30, 990 (1988)), have achieved specific conductivity $\kappa$ values of only about $10^{-5}$ S/cm at room temperature. Such values are too low (by two to three orders of magnitude for practical application.

Various modifications of these polymer ion conductors have been proposed in recent publications, but have also not produced practical (useful) specific conductivities combined with thermal or chemical stability (see, e.g., J. L. Bennet et al., Chem. Materials 1, 14 (1989) or D. Fish et al., Brit Polym. J. 20, 281 (1988)). For example, the polyethylene oxides tend to decompose either thermally or in the presence of reactive substituents into dioxane or other products. Additional attempts to provide solid ion conductors which are suitable as electrolytes or separators for solid batteries can be found in the patent literature.

For example, U.S. Pat. Nos. 2,933,547 and 2,861,116 disclose phenol-resin-based ion-exchange membranes which contain $Zn^{2+}$ ions for the mobile phase which are used as electrolytes for galvanic solid-state elements with zinc anodes. U.S. Pat. No. 3,186,876 and United Kingdom Patent No. 999,948 disclose a pure Na zeolite (e.g., in a Cu/Zn element) functioning as an ion-conducting separator, and in addition to this, a $Cu^{2+}$ zeolite which functions as a catholyte produced by a partial exchange of Na$^+$ ions.

European patent application 070,020 discloses a solid proton conductor used as an electrolyte, which is preferably also a zeolite. The disclosed proton conductivity is due to the insertion of proton-containing cations (e.g., $H_3O^+$, $NH_4^+$, $N_2H_5^+$) into the crystal structure, in which the immobile since they are bound to oxygen atoms of the disclosed silicic acid framework while forming hydroxyl groups. In this case, a "basic phase" ($NH_3$, $H_2O$, alcohol, organic amine) is introduced into the zeolite lattice to promote the transport of ions. Proton conductivities of more than $10^{-3}$ S/cm at room temperature, which are useful for battery purposes, were found with this material.

SUMMARY OF THE INVENTION

It is therefore the object of the present invention to provide an ion conductor which is bound to a solid material to immobilize the electrolyte fluid in a galvanic element with a nonaqueous electrolyte system without any substantial deterioration of the ion conductivity of the solid electrolyte in comparison to known solvent-based liquid electrolytes.

These and other objects are achieved in accordance with the present invention by providing an ion conductor or electrolyte which is proton non-conducting and which contains a powdery or pasty mixture of powdery, chemically inert and electronically non-conducting solids with aprotic solvents containing metal salts.

DETAILED DESCRIPTION OF PREFERRED EMBODIMENTS

The ion conductor of the present invention includes an inorganic solid as the above-discussed proton-conducting zeolitic material, but differs fundamentally in that it is not a proton conductor.

It was found in accordance with the present invention that powdery or powder-like, chemically inert solids which are also electron non-conductors yield solid or paste-like mixed products in mixture with solutions of metal salts in an aprotic solvent. The actual consistency (paste-like to solid) will depend on the amount of the liquid component. The resulting product was unexpectedly found to exhibit a conductivity as high or even somewhat higher than the selected aprotic electrolyte system used either alone or in a liquid phase.

Especially advantageous solids include various inorganic oxygen compounds such as $SiO_2$, $Al_2O_3$, $TiO_2$, $MgO$, $B_2O_3$, or mixtures thereof, as well as salts such as $Na_2SO_4$ and $AlPO_4$, or homologous or analogous compounds. The preferred oxygen-containing solids are those that have extensive surface areas and other oxides of inorganic compounds. Suitable oxides are available and are found in "CRC Handbook of Chemistry and Physics", Weast and Astle, CRC Press Inc., 62nd Edition. It is within the contemplation of the invention that other oxygen compounds which perform the same function in a substantially similar manner are within the scope of the invention.

In addition, the selection of lithium salt as the metal salt component has proved to be highly favorable, especially when using the ion conductor in lithium batteries. The transport number $t^+(Li^{30})$ for such ion species was determined to be considerably greater than 0.5, which indicates that the Li$^+$ ions predominantly form a charge-transporting mobile phase. Other preferred electrolyte salts are sodium salts.

The novel ion conductor also has good or satisfactory conductivity values in combination with other metal salts, such as Cu(I), Ag(I), Mg(II), Ca(II), Zn(II), Hg(II), Fe(II) and Al(III). In accordance with the invention, the negative electrode of the battery is preferably constituted of lithium, a lithium alloy, a lithium intercalating carbon material, or an alkali metal or alkaline earth metal.

The selection of the associated anion is not critical since virtually any or all of the anions which have been suggested for liquid aprotic electrolyte systems are suitable. In particular, $BF_4^-$, $AlCl_4^-$, $PF_6^-$, $AsF_6^-$, $ClO_4^-$, $CF_3SO_3^-$, as well as halogenide ions, are considered quite acceptable.

The suitable aprotic solvents in which the above-mentioned salts are dissolved are preferably open-chained or cyclic esters (like methyl formate, propylene carbonate, gammabutyrolactone, ethyl acetate) and/or open or cyclic ethers (like dimethyl ether, tetrahydrofuran, methyl tetrahydrofuran, 1,3-dioxolan, dimethoxyethane), or acetonitrile, nitromethane, dimethylsulfite, ethylene sulfite, dimethylformamide, dimethylsulfoxide, sulfolane, N-methylpyrrolidone or mixtures thereof. However, any other known aprotic solvent may also be used. The concentration of the salt should preferably lie between about 0.5 and about 2 moles, or to the limit of the solubility of the salt in the solvent.

The reducible cathode can be constituted of a lithium intercalating metal chalcogenide, including mixtures with conductive polymers such as polypyrrole and polyaniline. Especially suitable in this regard are $MnO_x$, $CrO_x$, $V_2O_5$, $TiS_2$, $CuO$, $FeS_2$, $Bi_2O_3$, $CoSn_xO_y$.

The conductivity of the resulting electrolyte generally amounts to at least $5 \times 10^{-4}$ S/cm at room temperature.

The production of an ion conductor according to the present invention comprises mixing the solid with the electrolyte solution, a relatively simple procedure. The amounts of the mixing components can be selected in any proportion depending upon the desired consistency of the final product, from a dry dust to a paste. As a rule, between 1 and 10 ml of electrolyte solution is used per 1 g of solid.

EXAMPLES

The following exemplary embodiments are provided to give an illustrative overview. In these embodiments, the samples subjected to conductivity testing (see also the tabulated compilation) were produced by maintaining the indicated amount of inert solid or carrier (A) under $N_2$ for several hours and under high vacuum, followed by storage under $N_2$. The solvent and the electrolyte salt were dried in the usual manner, and the electrolyte solution (B) was mixed from both. (A) and (B) were then mixed under $N_2$.

To determine the resulting specific conductivity ($\kappa$), resistances were measured several times per sample for samples pressed to a thickness of 0.7 mm, or samples shaped into a disc with a diameter of 13 mm, and as a paste, with an alternating current (4 kHz) and at different temperatures, or the resistance of the pure electrolyte was determined by measuring impedance. All tabulated specific conductivity ($\kappa$) values have a factor of $10^{-3}$ S/cm.

The trade names Aerosil 200 and Aerosil COK 84 in Table 1 stand for pure $SiO_2$ or for $SiO_2 + Al_2O_3$ at a ration of 4:1. All solids (A) are products of Degussa (Deutsche Gold- und Silber-Scheideanstalt, formerly Roessler, Frankfurt am Main).

TABLE 1

1. (A): 1.11 g Aerosil 200
   (B): 7.6 ml, 1M LiClO$_4$/AN, paste
   Measurement after storing for two weeks:

| T° C. | | | | | | |
|---|---|---|---|---|---|---|
| 22 | 32 | 41 | 50 | 60 | 70 | 80 |
| $\kappa$ 9.46 | 10.6 | 11.9 | 13.0 | 14.0 | 14.8 | 16.0 |

2. (A): 1.01 g Aerosil 200
   (B): 6 ml, 1M LiClO$_4$/AN, pourable powder
   Measurement after storing for two weeks:

| T° C. | | | | | | |
|---|---|---|---|---|---|---|
| 22 | 32 | 42 | 52 | 61 | 70 | 80 |
| $\kappa$ 8.16 | 8.82 | 9.42 | 10.0 | 10.6 | 11.4 | 12.1 |

3. (A): 0.45 g Aerosil 200
   (B): 2.7 ml, 1M LiClO$_4$/PC, pourable powder
   Measurement after storing for two weeks
   ($\kappa^*$ applies to pure 1M LiClO$_4$/PC solution)

| T° C. | | | | | | | | |
|---|---|---|---|---|---|---|---|---|
| −30 | −15 | −5 | 10 | 20 | 40 | 60 | 80 | 100 |
| $\kappa$ 1 | 1.5 | 1.9 | 3.0 | 4.5 | 5.7 | 7.5 | 9.0 | 10.1 |
| $\kappa^*$ 1.2 | — | 3.2 | — | 4.9 | — | — | — | — |

4. (A): 0.32 g Aerosil 200
   (B): 2 ml, 1M LiCF$_3$SO$_3$/gamma-butyrolactone, paste

| T° C. | | | | | | |
|---|---|---|---|---|---|---|
| 20 | 32 | 40 | 50 | 60 | 70 | 80 |
| R[Ω]* 15.2 | 13.5 | 12.1 | 10.8 | 9.6 | 8.6 | 7.9 |
| $\kappa$ 2.47 | 2.79 | 3.11 | 3.49 | 3.92 | 4.38 | 4.77 |
| Z[Ω]** 13.2 | 11.4 | 10.3 | 8.95 | 8.12 | 7.41 | 6.81 |
| $\kappa$ 2.85 | 3.30 | 3.65 | 4.21 | 4.64 | 5.08 | 5.53 |

5. (A): 0.7 g Aerosil COK 84 [SiO$_2$ + Al$_2$O$_3$]
   (B): 5 ml, 1M LiClO$_4$/propylene carbonate, paste
   (room temperature, after one hour) = 4.7;
   measurement after storing for one week:

| T° C. | | | | | | | | |
|---|---|---|---|---|---|---|---|---|
| 22 | 32 | 41 | 50 | 60 | 70 | 80 | 90 | 100 |
| $\kappa$ 5.48 | 6.21 | 7.10 | 8.15 | 9.57 | 11.5 | 13.4 | 14.7 | 16.3 |

6. (A): 1.01 g Aerosil COK 84 [SiO$_2$ + Al$_2$O$_3$]
   (B): 6 ml, 1M LiClO$_4$/acetonitrile, paste
   Measurement after storing for two weeks:

| T° C. | | | | | | |
|---|---|---|---|---|---|---|
| 22 | 32 | 40 | 50 | 60 | 70 | 80 |
| $\kappa$ 8.56 | 9.19 | 9.78 | 10.3 | 10.8 | 11.4 | 11.9 |

7. (A): 0.25 g Aerosil COK 84
   (B): 1.6 ml, 1M LiClO$_4$/gamma-butyrolactone, paste

| T° C. | | | | | | |
|---|---|---|---|---|---|---|
| 25 | 32 | 40 | 50 | 60 | 70 | 80 |
| R[Ω]* 7.8 | 6.3 | 5.6 | 5.1 | 4.4 | 3.9 | 3.4 |
| $\kappa$ 4.83 | 5.98 | 6.72 | 7.38 | 8.56 | 9.66 | 11.0 |
| Z[Ω]** 4.30 | 3.91 | 3.52 | 3.13 | 2.72 | 2.48 | 2.13 |
| $\kappa$ 8.76 | 9.63 | 10.7 | 12.0 | 13.8 | 15.1 | 17.6 |

8. (A): 0.20 g Aerosil COK 84
   (B): 1.5 ml, 1M LiCF$_3$SO$_3$/gamma-butyrolactone, paste
   For comparison, impedance measurements were made here.

| T° C. | | | | | | |
|---|---|---|---|---|---|---|
| 22 | 30 | 40 | 50 | 60 | 70 | 80 |
| R[Ω]* 19.0 | 17.0 | 15.2 | 13.6 | 12.2 | 10.9 | 9.8 |
| $\kappa$ 2.57 | 2.88 | 3.22 | 3.60 | 4.00 | 4.49 | 4.99 |
| Z[Ω]** 12.5 | 10.9 | 9.6 | 8.6 | 7.79 | 7.12 | 6.40 |
| $\kappa$ 3.91 | 4.49 | 5.10 | 5.69 | 6.28 | 6.87 | 7.65 |

9. (A): 1.01 g aluminum oxide C
   (B): 6 ml, 1M LiClO$_4$/AN, paste
   Measurement after storing for two weeks:

| T° C. | | | | | | |
|---|---|---|---|---|---|---|
| 22 | 32 | 40 | 50 | 60 | 70 | 80 |
| $\kappa$ 8.29 | 9.01 | 9.85 | 10.9 | 12.2 | 13.3 | 14.5 |

10. (A): 0.83 g titanium oxide P 25
    (B): 3 ml, 1M LiClO$_4$/PC, paste
    Measurement after storing for one week:

| T° C. | | | | | | |
|---|---|---|---|---|---|---|
| 25 | 35 | 40 | 50 | 60 | 70 | 80 |
| $\kappa$ 3.94 | 4.87 | 5.18 | 6.23 | 7.53 | 8.81 | 10.1 |

11. (A): 3.14 g Na$_2$SO$_4$
    (B): 0.72 ml, 1M LiCF$_3$SO$_3$/PC, paste
    T° C.

TABLE 1-continued

| | 20 | 30 | 40 | 50 | 60 | 70 | 80 |
|---|---|---|---|---|---|---|---|
| κ | 0.24 | 0.29 | 0.35 | 0.42 | 0.51 | 0.61 | 0.68 |

*sum of all resistances measured with a bridge
**impedance (resistance of the electrolyte alone)

It was found that the samples required a certain amount of time, generally one or two weeks, to reach a specific conductivity (κ) value, Presumably, defined boundary layers of a "uniform covering" are formed during this period.

Only slight differences in conductive behavior result between pourable and pasty products (i.e., depending on their consistency). Critical to good conductivity is the degree of absorption of the solid until all particles are adequately coated or enveloped. An excess of "freely mobile" electrolyte can be tolerated, but is not necessary. The ion conductor of the present invention is also resistant to repeated heating.

Details as to the quality of some solids ($TiO_2$, $SiO_2$, $Al_2O_3$) that are especially favorable for producing an ion conductor according to the present invention are available with reference to Table 2, below. These solids are the same commercial products as in the samples presented in Table 1, which are all produced pyrogenically. Increasing the specific surface area of the carrier material produces an increase in specific conductivity (κ) values.

TABLE 2

| | $TiO_2$ P25 | Aerosil 200 | Aerosil COK 84 | $Al_2O_3$ C |
|---|---|---|---|---|
| Surface ($m^2/g$) | 50 ± 15 | 200 ± 25 | 170 ± 30 | 100 ± 15 |
| pH (susp. in $H_2O$) | 3–4 | 3.6–4.3 | 3.6–4.3 | 4–5 |
| Particle size (nm) | 30 | 12 | — | 20 |

The above study shows that an ion conductor produced according to the present invention, with a solid to semi-solid consistency, attains a specific conductivity (κ) of a magnitude $>10^{-3}$ S/cm at room temperature, and even $>10^{-2}$ S/cm at higher temperatures up to 100° C. Thus, for the first time it is possible to produce primary and secondary solid batteries with useful output characteristics, without using liquid organic electrolytes. Since the chemically inert, inorganic solid which serves as the carrier and electrolyte-absorbing medium is based on an aprotic solvent, the ion conductor is temperature-resistant and can be used in a temperature range of from about −50° C. to temperatures near the boiling point of the pure solvent.

The more or less pasty electrolytes of the present invention have many advantages over liquid electrolytes. They are easy to produce and to process (they can be measured out volumetrically). They adhere well to anodes and cathodes. They are especially suitable for the miniaturization of cells since they can be used in thin layers without additional separation. They have a certain mechanical stability which hinders the development of dendrites, yet which allows the balance of volume batches without loss of contact with anodes and cathodes in the presence of hard solid-state ion conductors ($Li_3N$, $Li_4SiO_4$). They do not have a tendency to creep under seals, which facilitates sealing of the cells, and the resulting gel binds volatile solvents and thus prevents the cell from drying out.

Experiments carried out with button cells show the advantages of using the electrolyte of the present invention both in primary and in secondary elements. In this experiment, cells of the $Li/CuO$, $Li/FeS_2$ and $Li/MnO_2$ type served as examples of a primary system, and a Li/polypyrrole cell served as an example of a secondary system. The electrolyte used for this purpose was produced from 2.2 g of Aerosil 200 and 15ml of 1M $LiClO_4$/PC. Comparison cells contained a conventional $LiClO_4$/PC liquid electrolyte.

In the primary elements tested, the electrolyte of the present invention resulted in a clearly improved capacity (efficiency) for the cathode materials, as the comparisons shown in Table 3 illustrate. These comparisons are made at a one-hour current.

TABLE 3

| Cathode material | Cell with electrolyte according to the invention (Ah/kg) | Cell with liquid electrolyte (Ah/kg) |
|---|---|---|
| CuO | 215 | 184 |
| $FeS_2$ | 276 | 122 |
| $MnO_2$ | 216 | 194 |

During discharge, the primary cells exhibited voltage levels that were higher by at least 100 mV, than the comparison cells with solid-free liquid electrolyte.

When using the electrolyte of the present invention in lithium secondary cells, the very low polarization gradient exhibited by the Li electrode, as shown in continuous cycle testing of Li/Li cells, is a favorable prerequisite. In agreement with this is that a Li/polypyrrole cell according to the present invention could be cycled with a current output about 20% higher than the comparison cell with a conventional $LiClO_4$/PC electrolyte.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A non-liquid ion conductor/electrolyte for galvanic elements which, consists essentially of a mixture of a chemically inert and electronically non-conducting inorganic solid with a metal salt-containing aprotic solvent.

2. The ion conductor/electrolyte of claim 1 wherein the metal salts are lithium salts.

3. The ion conductor/electrolyte of claim 1 wherein the metal salts are sodium salts.

4. The ion conductor/electrolyte of claim 1 wherein the anions of the metal salt are selected from the group consisting of $BF_4-$, $AlCl_4-$, $PF_6-$, $AsF_6-$, $ClO_4-$, $CF_3SO_3-$, F—, Cl—, Br— and I+.

5. The ion conductor/electrolyte of claim 1 wherein the aprotic solvent is selected from the group consisting of propylene carbonate, acetonitrile, gamma-butyrolactone, nitromethane, tetrahydrofuran, methyltetrahydrofuran, dimethoxyethane, dioxolan, methyl formate, ethyl acetate, dimethyl ether, dimethylsulfite, ethylene sulfite, dimethylformamide, dimethylsulfoxide, sulfolane, N-methylpyyrrolidone, and mixtures thereof.

6. The ion conductor/electrolyte of claim 1 wherein the inert and electronically non-conducting solid is selected from the group consisting of $SiO_2$, $Al_2O_3$, $TiO_2$, MgO, $B_2O_3$, $Na_2SO_4$, $AlPO_4$ and mixtures thereof.

7. The ion conductor/electrolyte of claim 6 wherein the solids have a surface area $>50$ m$^2$/g.

8. The ion conductor/electrolyte of claim 1 which have a specific conductivity of at least about $10^{-3}$ S/cm at room temperature.

9. The ion conductor/electrolyte of claim 1 which is operative in the temperature range of about $-50°$ C. to about the boiling point of the pure aprotic solvent.

10. The ion conductor/electrolyte of claim 1 which has a consistency adjustable between a solid and a paste.

11. A galvanic element comprised of a negative electrode which comprises an alkali metal or an alkaline earth metal, a positive electrode which comprises a transition metal chalcogenide or a conductive polymer, and an ion conductor/electrolyte which consists essentially of a mixture of a chemically inert and electronically non-conducting inorganic solid with a metal salt-containing aprotic solvent.

* * * * *